Oct. 19, 1948.   E. HOPKINS   2,451,734
METHOD OF AND MEANS FOR THE TRANSMISSION
AND REPRODUCTION OF OPTICAL
AND ACOUSTICAL EFFECTS
Original Filed Jan. 26, 1922   5 Sheets-Sheet 1

Inventor:
Edwin Hopkins

Oct. 19, 1948.  E. HOPKINS  2,451,734
METHOD OF AND MEANS FOR THE TRANSMISSION
AND REPRODUCTION OF OPTICAL
AND ACOUSTICAL EFFECTS
Original Filed Jan. 26, 1922  5 Sheets-Sheet 3

Inventor:
Edwin Hopkins

Fig. 16.

Fig. 17.   Inventor:

Inventor:

Patented Oct. 19, 1948

2,451,734

UNITED STATES PATENT OFFICE 2,451,734

METHOD OF AND MEANS FOR THE TRANSMISSION AND REPRODUCTION OF OPTICAL AND ACOUSTICAL EFFECTS

Edwin Hopkins, New York, N. Y.

Original application January 26, 1922, Serial No. 531,990, now Patent No. 2,056,967, October 13, 1936. Divided and this application May 26, 1941, Serial No. 395,264

3 Claims. (Cl. 178—5.6)

It is to be noted that this is a divisional application of an application for patent by the same inventor and under the same title, filed October 9, 1936, Serial Number 104,818, once pending, which in turn is a divisional application of an application for patent by the same inventor, filed January 26, 1922, Serial Number 531,990, from which issued to the same inventor Patent No. 2,056,967, dated October 13, 1936, under the title of Photo-electric thermionic cell, and thus the present application is entitled to the filing date of January 26, 1922 for purposes of reference and otherwise.

The main purpose of my invention is to transmit talking motion pictures by wireless or by guided wave (wired wireless) telephony from an original rendition, simultaneously therewith, to a multiplicity of widely separated audiences without, necessarily, producing permanent records of the optical and acoustical effects. Set up in a theatre, or in Congress, or at an athletic contest or elsewhere, the apparatus will deliver to distant audiences simultaneously reproductions of the scenes being enacted, together with the accompanying sounds, and to audiences of any size whatever.

There are various other uses for variant forms of the invention, one being the reproduction of an ordinary moving picture on an illuminated outdoor advertising sky sign.

The main principle of my invention is to provide a plurality of cells electrically sensitive to changes of light, such as photo-electric cells, so placed as to cover a bank receiving light images, each cell receiving simultaneously a portion of the optical image. Each cell is then connected to a segment of a circular, stationary commutator. A brush rotates at a high rate of speed around the commutator and picks up successively impulses of current from each cell, the strength of the impulses depending on the intensity of the light falling on the cell. The brush may rotate sixteen times per second and thus pick up sixteen impulses per second from each cell. If the cells are ⅜" apart in a bank ten by twelve feet, there will be 320 vertical rows and 384 horizontal rows of cells, a total of 122,880 cells in the bank. At sixteen revolutions per second the travelling brush would deliver 1,966,080 impulses of varying strength, some of zero value for cells in portions of the image in shadow, per second.

These successive pulsations are then amplified and transmitted by wireless or wired wireless means to the receiving station where they are delivered to a similar travelling brush which transmits them to the individual segments of a stationary commutator, each of which is connected to an incandescent lamp, the location of which, in a bank of lamps, is analogous to the location of the cell in the cell bank in the sending station from which it derives its impulses, each lamp receiving sixteen impulses per second. Thus the lamp bank reproduces the light image directed upon the cell bank. A supplementary circuit keeps the brush motors in synchronism. Simultaneously acoustical effects are transmitted and reproduced in a manner to be described. Since the optical and acoustical effects are produced simultaneously, they will be reproduced simultaneously and in synchronism, so that it is only necessary to keep the motors rotating the brushes in synchronism to produce the effect of talking motion pictures. If the motors get out of synchronism a distortion of the image will result.

To prevent such distortion in practice it is desirable to provide a stationary commutator for each of the horizontal rows of cells, there being thus 320 commutators and 320 traveling brushes. The 320 circuits may be transmitted by the method of band frequencies as practiced in multiplex telephony, more than one pair of conductors being used. Band frequencies to the number of 32 are ordinarily used in telegraphy, but a much larger number is possible so that a few circuits, or even one might suffice. In wireless transmission different wave lengths would be used. With 320 commutators each ¼" wide, having 384 segments ¼" thick, an apparatus ten or twelve feet long and a yard in diameter would serve to convert the impulses from the bank to the transmitting wires. No distortion of the image would occur if the motor were out of synchronism in such event as the image would merely float across the screen bank like a moving picture being framed, remaining steady when synchronism between the motors were obtained.

Where an actual scene is to be transmitted a further important feature of my invention consists of a large camera to be focussed on the scene, the cell bank taking the place of the customary photographic plate. Where a motion picture is to be reproduced it may be thrown upon an ordinary screen in the view of the camera, or else the camera may be entirely removed and the motion picture thrown directly on the cell-bank as a screen.

A variant form of my invention consists of a device in the form of a paddle wheel, each paddle bearing a row of cells which are swept across the optical image, one every sixteenth of a second, communicating with a similar whirling lamp-bank, each file of cells on the paddles having its own commutator and brush and circuit communicating with similar parts on the whirling lamp-bank. The cell passing through the image receives variations of light which are communicated to the lamp passing through the reproducing frame.

In carrying out my invention, I find it desirable to employ the following apparatus, methods, processes and manufactures, but it is to be understood that in carrying out the objects of my invention, less than all of the different methods, means, mechanisms, processes and manufactures herein described may be employed, or other methods, means, mechanisms, processes and manufactures similar may be substituted, and while the preferred methods and the forms embodying my invention are shown, it is to be understood that many of the structural details may be varied and many changes in details resorted to without departing from the scope and spirit of my invention, nor do I limit myself to the particular methods, means, devices and processes shown, although I believe them especially suited to the ends to be attained by my invention.

In the accompanying drawings, illustrating a form of the invention, and forming a part hereof, the same reference letters and numerals indicate the same or corresponding parts.

Sheet No. 1

Sheet No. 2—The consecutive distributor

Sheet No. 3

Sheet No. 4

Sheet No. 5

Figure 1:
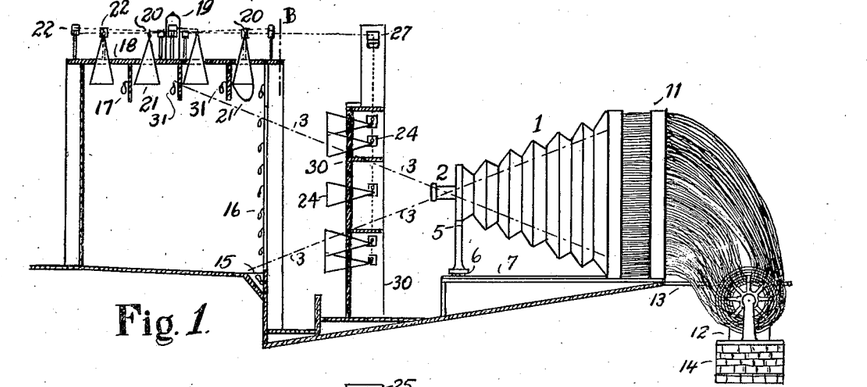
Fig. 1 is a longitudnal section on line A—A.
Figures 3, 4:
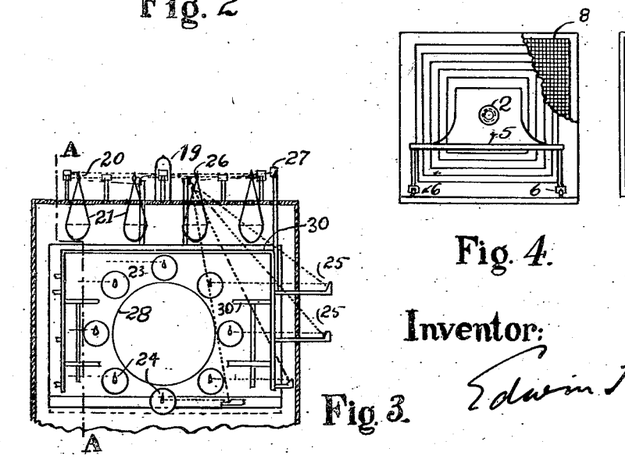
Fig. 3 is a front sectional elevation partly on line B of Fig. 1 showing the apparatus in position to transmit from an actual scene.
Fig. 4 is a front elevation of the camera, broken away to show the cell bank

The cell camera 1 with lens 2 is focussed on the stage along sight lines 3 and 4. The front of the camera is supported by framework 5, with rollers 6 on tracks 7 for focussing.

Figure 5:
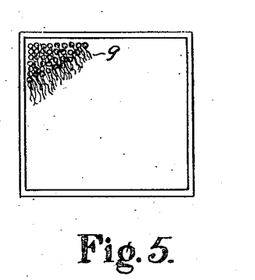
Fig. 5 is a partial rear elevation of the camera.

Various other appurtenances of cameras may be included. The rear of the cell camera is fited with a bank of photo-electric cells at 8, the terminals of the leading-in wires being seen at 9. The leading-in wires pass to cross-overs, 10 and 11, and from there to the consecutive distributor 12, in this instance mounted below floor 13 on foundation 14.

The stage is illuminated in the customary manner with footlights 15, side lights 16 and border lights 31. Above the stage is placed ceiling 18 and a special photo-electric cell 19 which receives rays of light from manometric flames 20, caused to vibrate in acoustical frequencies by the voices of the actors caught by horns 21. Mirrors 22 are so arranged that the distance traversed by the rays of light from each of the manometric flames to the photo-electric cell 19 is the same. Thus, if each manometric flame is of the same intensity, sounds of equal force will be equally transmitted from each horn. Thus actors may walk about the stage and read their lines in the customary manner without the changes in volume in the transmitted tone which would occur if they spoke at varying distances from a central horn.

The light from the several manometric flames falling on a single photo-electric cell, which accordingly varies the current which it transmits, enables the sounds from the several horns to be amalgamated electrically speaking without the distortion which takes place when sounds are collected from multiple horns each having its own microphone. The manometric flame as a means of recording acoustical effects is very old in the art, but the combination of a plurality of manometric flames directed upon a single photo-electric cell, especially at distances made equal by mirrors when the horns cannot be at equal distances, is a novel and highly valuable feature of this invention. The manometric flames are preferably hooded in order to transmit a maximum of light in the proper direction, such hoods containing suitable reflectors.

Figure 2:
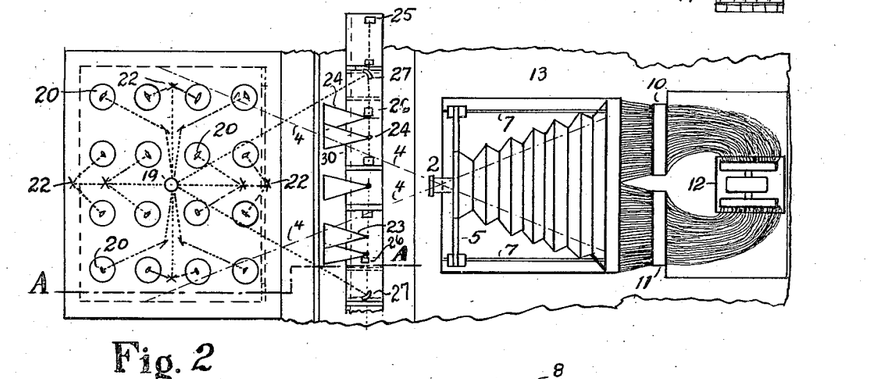
Fig. 2 is a plan of a portion of a theatre.

The central light sensitive cell is preferably a photo-electric cell, but it may be a selenium cell or a high-resistance cell, or any cell of a substance by which variations in acoustical effects at the horns may be transferred into electrical variations. In front of the stage is placed an additional group of horns 23, with manometric flames 24 and mirrors 25 which reflect light to mirrors 26, thence to mirrors 27 from which the photo-electric cell 19 is reached by the light. Horns 23 are out of the line of focus of the cell camera 1, as indicated by the circle 28. Horns 23 and horns 21 may be used simultaneously, or either bank may be used separately. In case an audience views the performance, horns 23 could be dispensed with and the cell camera be made smaller. This is desirable as the actors perform to better advantage before an audience, and its applause would be transmitted and would enable the actors to time their lines to avoid reading into the applause of distant hearers.

The cells of the cell bank camera are preferably photo-electric cells, although selenium cells, high resistance cells or other cells or substances adapted to change light variations into electrical variations may be used. As the variations in light to be utilized optically are far less rapid than the acoustical variations, it is more feasible to use selenium in the cell bank camera than in the acoustical translating device. A much smaller cell bank camera may be constructed if photo-electric cells are not used, but less likely to be reliable.

Horns 21 are shown extended through the ceiling 18 and masked by masking pieces 29, but in a theatre the ceiling 18 may be merely a swinging bridge, while the masking pieces may be borders. Horns 24 are supported by frame work 30 erected in the auditorium, but if an audience be played to, these horns could be disposed about the proscenium arch or near the side lights 16 inside the proscenium or be dispensed with. Microphones may be used instead of manometric flames, within my invention, their current directly amalgamated, or each microphone may be caused to produce light in an incandescent lamp and the light of such lamps amalgamated into a single current through a photo-electric cell. Additional horns may be placed back of the scenes if desired.

Figure 19:
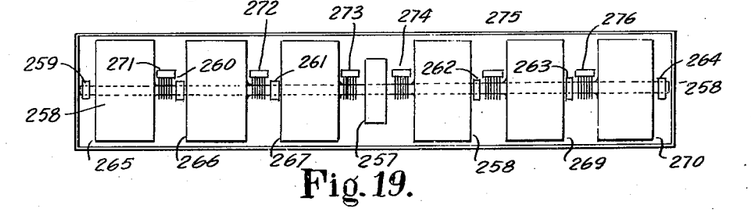
Fig. 19 is a plan of a consecutive distributor showing the lay-out of the machine for commutators for each row of lamps grouped on six sets of commutators and brushes.

The consecutive distributor is shown in Figs. 6 to 10 and a form of it in Fig. 19. The consecutive distributor shown in Figs. 6 to 10 is adapted to have four sets of stationary commutators and four separate circuits. Only one may be used, or one may be used and another used as an idler, or the consecutive distributor may be constructed for a greater number of circuits as indicated in Fig. 19.

Figures 6, 7:
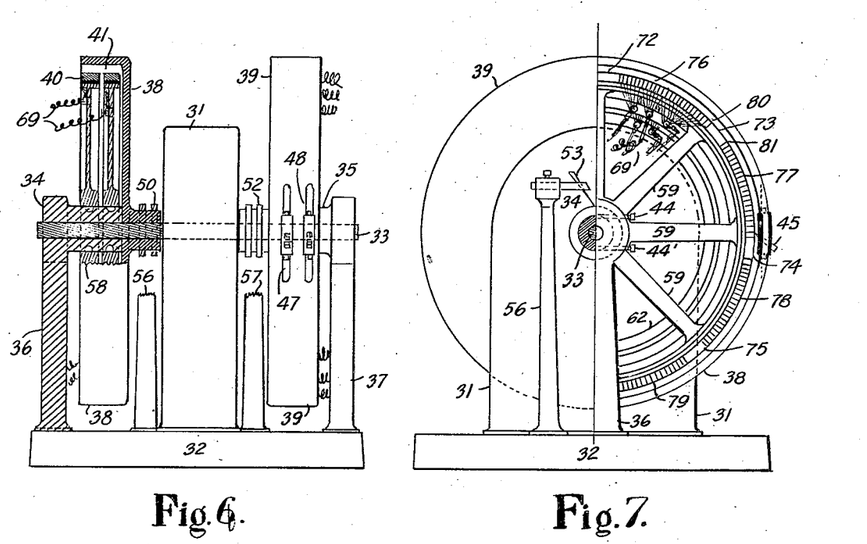
Fig. 6 is a side elevation partly in section.
Fig. 7 is an end elevation partly in section.
Figure 8:
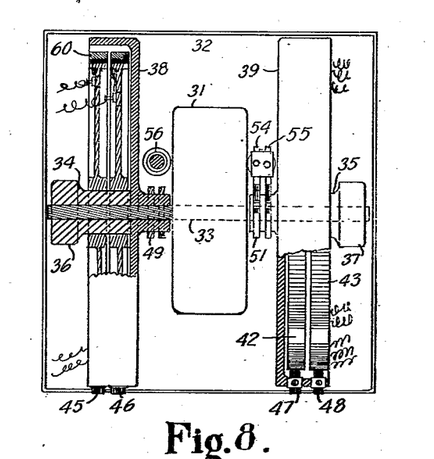
Fig. 8 is a plan, partly in section.

Electric motor 31 is mounted on base 32, deriving its power from any suitable source. Its control shaft 33 runs in bearings 34, 35 supported in columns 36, 37. Shaft 33 carries bowls 38, 39, which rotate with the shaft. In some cases one bowl may be an idler to be rotated manually. These bowls may merely be arms to carry the brushes, but less air resistance is created by the bowls and they may be better balanced for high speeds and run with less noise. Bearing 34 carries commutator rings 40, 41, and bearing 35 carries commutator rings 42, 43. These rings are stationary and concentric with the shaft. A very slight movement of rotation of the rings is provided for by screws 44, 44', merely for purposes of adjustment, one screw being loosened and the other tightened to effect the minute degree of adjustment required to keep them in line or to keep in line the moment of contact of the brushes if the latter cannot be perfectly adjusted.

Brushes 45, 46 bear on commutator rings 40, 41, and brushes 47, 48 bear on rings 42, 43. These traveling brushes are carried on the rotating bowls. Current passes from brushes 45, 46 to collector rings 49, 50 and from brushes 47, 48 to collector rings 51, 52 mounted on the hubs of the bowls, from which it passes to stationary brushes, as 53, 54, 55 on pillars 56, 57. Necessary adjustment of the brushes is provided for, and the several electric currents are properly insulated.

Figure 9:
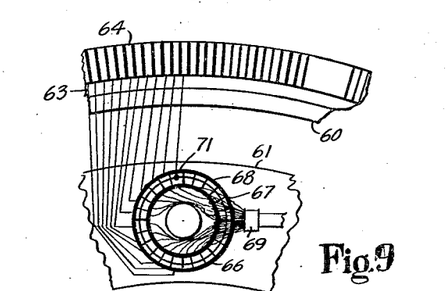
Fig. 9 is an end elevation of a portion of the commutator.
Figure 10:
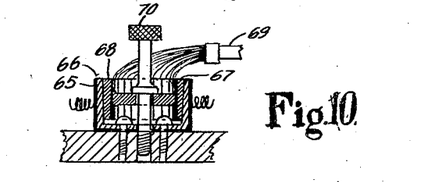
Fig. 10 is a sectional detail of a cable connector.

The stationary commutator rings consist of hub 58, spokes 59, rims 60 and webs 61, 62 between the spokes. Details of a method of cable plugging are shown in Figs. 9 and 10. Rim 60 carries an insulating tire-like portion 63, in which are embedded the segments 64 of the commutator. Attached to web 61 is plug receptacle 65 containing segments 66 of any desired number, each electrically connected to an individual segment 64. Receptacle 65 receives cable plug 67 having segments 68 equal in number to the segments 66 of receptacle 65, and each connected to an individual wire of cable 69. Plug 67 and receptacle 65 may be slightly tapered to fit more snugly together. Thumb screw 70 is provided to hold the plug more securely in the receptacle.

Guide 71 assures the proper adjustment of plug and receptacle segments. Web 62 carries receptacles for commutators 41 in the same manner as web 61 for commutator 40. Additional webs may be provided or receptacles may be attached to the spokes 59.

Spaces as 72, 73, 74 and 75 are provided in the commutator ring where there are no segments, between sets of commutator segments, as 76, 77, 78, 79. If it be arranged to supply one row of horizontal lamps in the lamp bank through one set of commutator segments, as 76 between spaces 72, 73, and so on, the end segment 80 of set 76 will supply the terminal end lamp of the lamp bank and segment 81 will supply the initial end lamp of the next lower horizontal row of lamps in the lamp bank. Then if the motors get out of synchronism no distortion of the image will occur until the discrepancy is greater than the blank spaces, as 72, 73, 74, 75, but the image of the lamp bank will float to one side or the other and a corresponding number of end lamps on one end or the other will be entirely dark. As synchronism is approached the dark edge will light up and the image center itself on the bank. If the discrepancy is more than the distance 72 the lost lamps on one side or edge will begin to appear on the other edge but a row lower or higher as the case may be, with a dark band between them. The main image may float entirely across or even flash across rapidly and repeatedly until synchronism is effected on some one of the segments.

Fig. 19, Sheet 5, is a plan of a form of the consecutive distributor which avoids distortion or misplacing of the image. Motor 257 rotates shaft 258 running in bearings 259, 260, 261, 262, 263, 264. Traveling brush bowls are shown at 265, 266, 267, 268, 269, 270, and collector rings and stationary brushes therefor at 271, 272, 273, 274, 275, 276. If it be desired to transmit 384 circuits in band frequencies, or one band frequency and circuit for each vertical row of lamps on a lamp bank 320 rows high by 384 rows wide, six bowls would accommodate 64 commutator rings each and each ring would have 320 segments. If the segments be ¼" wide and ¼" thick each set of commutators would be 16" wide and 27" in diameter, with bowls slightly larger. The power required to rotate the brushes is small as no work has to be done save the overcoming of friction. Where vertical rows are transmitted in band frequencies the image would float up or down, similar to the customary framing of a motion picture film. If the 122,880 segments be placed on a single commutator, 100 segments to the inch, a commutator some 30 feet in diameter would be required, but no division into band frequencies would be needed. The 16 impulses per second transmitted to each of the lamps in the lamp bank would be much shorter impulses than those transmitted by the apparatus with the more numerous commutator rings.

Figure 11:
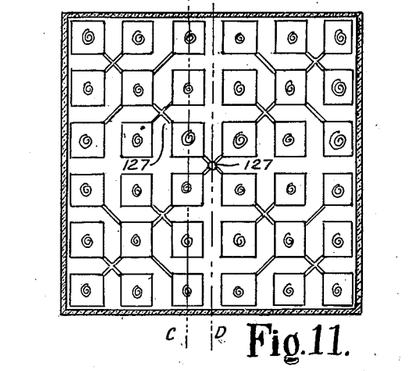
Fig. 11 is a sectional plan of a unit of the lamp bank on line B of Fig. 12.
Figure 12:
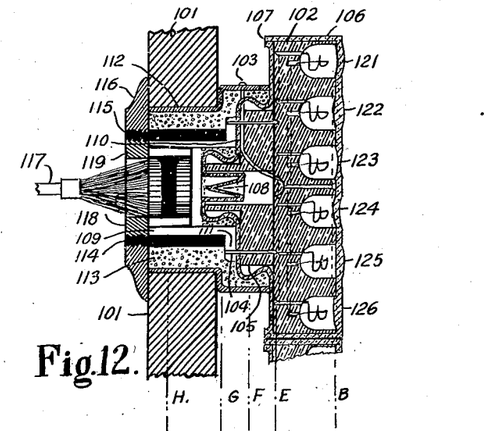
Fig. 12 is a transverse section of the lamp-bank in position with leading in cable, the drawing taken at selected levels in lines C and D of Fig. 11.
Figure 13:
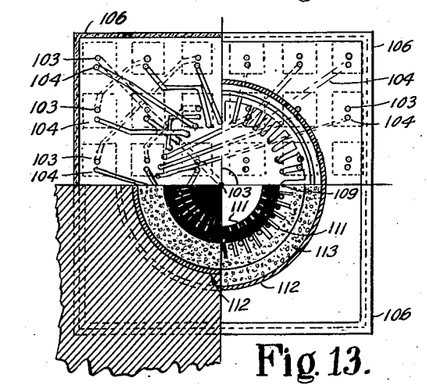
Fig. 13 is a sectional plan of a unit of the lamp bank with certain details omitted and others in skeleton. The upper left quarter is on line E, the upper right quarter on line F, the lower right quarter on line G and the lower left quarter on line H of Fig. 12.
Figure 14:
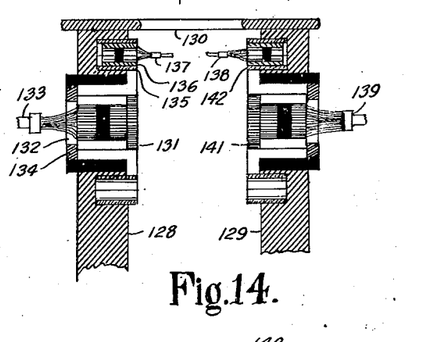
Fig. 14 is a vertical cross section of the cross-over, showing cable connections.
Figure 15:
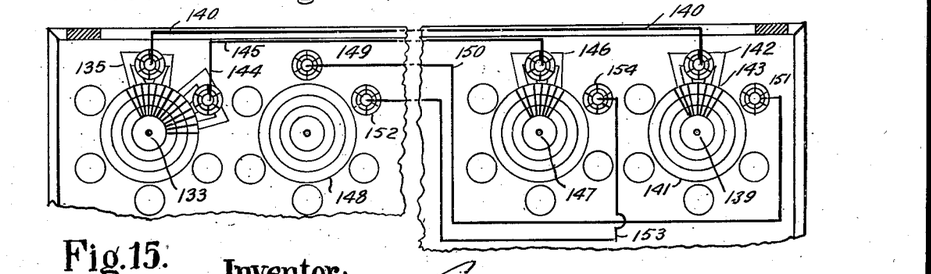
Fig. 15 is a diagram of cable connections of the cross-over.

The cell bank and lamp bank are shown in Figs. 11, 12, and 13 and the cross-over in Figs. 14 and 15, Sheet 3.

The lamp bank and cell bank are similar in construction so that only the substitution of cell elements for lamp elements is needed to utilize the structure for cell bank purposes. The lamp bank consists of a foundation slab 101, standing in a vertical position with any convenient method of support. The foundation slab has a series of equidistant, circular apertures, each adapted to receive a lamp unit, the apertures being in rows horizontally and vertically. These apertures are designed to hold lamp units. A lamp unit is a lamp with a plurality of individual elements. Thus the lamp unit with a plurality of individual elements illustrated has thirty-six chambers, each containing a light element, and thus taking the place of 36 individual lamps. Individual lamps may be used within the invention, but lamp units as indicated, reduce the expense of manufacture and particularly the trouble of mounting and handling. The lamp unit is constructed of a moulded base block 102 with 36 chambers each containing an incandescent filament, having a common terminal 103 and individual terminals 104, which pass through a moulded backing block 105. An outer glass cover bowl 106 is slipped on over the block 102, and an inner glass cover bowl 110 is slipped on over block 105, the leading in wires being sealed in through the glass of the inner cover bowl. The cover bowls are then sealed at the edge 107 and the structure is then evacuated in the customary manner at 108. Cable receptacle 109 is put in position, having segments 110 with feet 111, each of which connects to a leading in wire of one of the incandescent chambers. Cylinder 112 is cemented in place with cement 113. The insulation 114 of the receptacle is threaded at 115 and washer nut 116 serves to hold the lamp unit firmly in position on the foundation slab, which is arranged to provide a common electrical terminal for all the lamp units. Cable 117 is composed of thirty-six wires each attached to a segment of cable plug 118. Washer ring 119 is externally threaded and screws into threads in insulation 114 of the receptacle, and thus holds the cable plug firmly in position. Adjoining lamp units are of the same construction and the distance between the incandescent chambers of neighboring chambers of adjoining units is the same as the distances in the unit itself, so that the whole bank is covered with incandescent points all equally distant from their neighbors. The distance shown is ½", or 576 incandescent chambers per square foot in sixteen lamp units. At ⅜" centers there would be 1024 per square foot in something over 28 lamp units. The smaller the chambers are made the finer will be the motion picture when viewed from a near distance, but if the lamp bank be made of large size with large individual lamps or chambers it may be viewed from a great distance and have the same relative clarity.

The outer cover bowl 106 is shown with various configurations of surfaces before the incandescent chambers, merely by way of illustration, as 121, 122, 123, 124, 125 and 126, having the effect of lenses of different characters, from which may converge or diverge the rays of light for various uses. Or the glass before the incandescent chambers may be flat. Channels 127 enable air to be withdrawn from the various incandescent chambers during evacuation.

When used as a cell bank the chambers may be lined with a photo-electric element and a control rod be arranged to serve as the anode or vice versa. The center rod may support the photo-electric element, or the chambers may contain selenium or other substance whose electrical conductivity varies with the changes in light intensity to which they are subjected.

For the cell bank which is less exposed than the lamp bank and less liable to wear and tear, individual cell elements may be employed, instead of cell elements in units of thirty-six, in which case the surface could be more completely covered, that is with less space between the chambers. For moving pictures to be viewed at great distances the lamp bank may be very large and individual incandescent lamps of ordinary sizes used.

The cross-over is a means of connecting the commutator segment cables with the cell bank and lamp bank cables, especially when a lamp unit system is used. The cross-over consists of two foundation slabs 128, 129 connected by cross bars 130, and otherwise as may be convenient. Cable plug receptacle 131 is fitted into the slab 128 and has the same number of segments as cable plug 132 of cable 133 which fits into it, thirty-six in the example shown. Washer nut 134 holds cable plug 132 in the receptacle. On the inside of the cross-over every six of the segments of the receptacle are connected to a minor or secondary receptacle facing the other way, 135, having six segments and being adapted to receive minor cable plug 136 of minor cable 137. The opposite side of the cross over is similarly constructed, with leading-out minor cable 138 and leading-out major cable 139 with thirty-six segments and wires.

The connections are shown in the diagram, Fig. 15. Leading-in cable 133 from a stationary commutator has its first six segments connected to a minor receptacle 135. Minor cable 140 leads to a minor leading-out cable receptacle 142 which is connected to six segments of the receptacle 141 of major leading-out cable 139 leading to a lamp unit. The six segments shown at 143 connected to 142 lead to the first upper horizontal row of six incandescent chambers of the lamp unit. Thus each of such six incandescent chambers is illuminated in succession as the traveling brush on the commutator advances past segments connected to 135. The next six segments encountered by the traveling brush are connected to minor receptacle 144 and by minor cable 145 to minor receptacle 146, and by means of leading-out cable 147 to a lamp unit adjoining the first lamp unit. Thus the upper horizontal row of lamps of the adjoining unit are illuminated in turn. Continuing all the thirty-six segments of 133 are in turn connected to the upper row of succeeding lamp units. Assuming that the lamp bank is but six lamp units wide, the next section of the stationary commutator is connected to receptacle 148 and the first six segments to minor receptacle 149, leading by minor cable 150 to minor receptacle 151, which leads by way of cable 139 to the second horizontal row of lamp units. The brush next reaches segments connected to minor receptacle 152 leading by minor cable 153 to minor receptacle 154 which illuminates the second horizontal row of the second lamp unit, and so on.

Other arrangements are possible, as in Fig. 13 the upper row if illuminated from right to left is followed by the second row of the same lamp unit from left to right. This is accomplished in the lamp unit itself by the leading wires from the various chambers to the segment plugs. Where individual lamps are used the cross-overs may be simplified or omitted or incorporated with the rear of the cell bank and lamp bank, and the necessary cross matching of wires carried out in the connections of the strands of the cable itself to selected plug segments.

Owing to the fact that the incandescent filaments are required to change rapidly in illuminating power, and that the photo-electric cell often gives off more power when filled with certain gases instead of being entirely evacuated, as hard lamps or hard cells, the chambers may be first evacuated and then filled with the selected gases both as regards lamps and cells.

Figure 16:
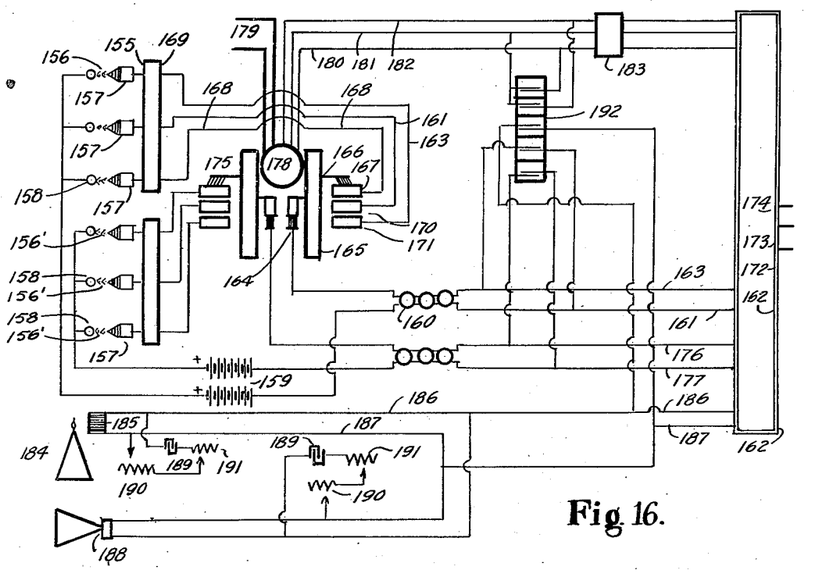
Figs. 16 and 17 are diagrams of the electrical connections of the whole system of radio talkies, Fig. 16 being the sending station and Fig. 17 the reproducing station.
Figure 17:
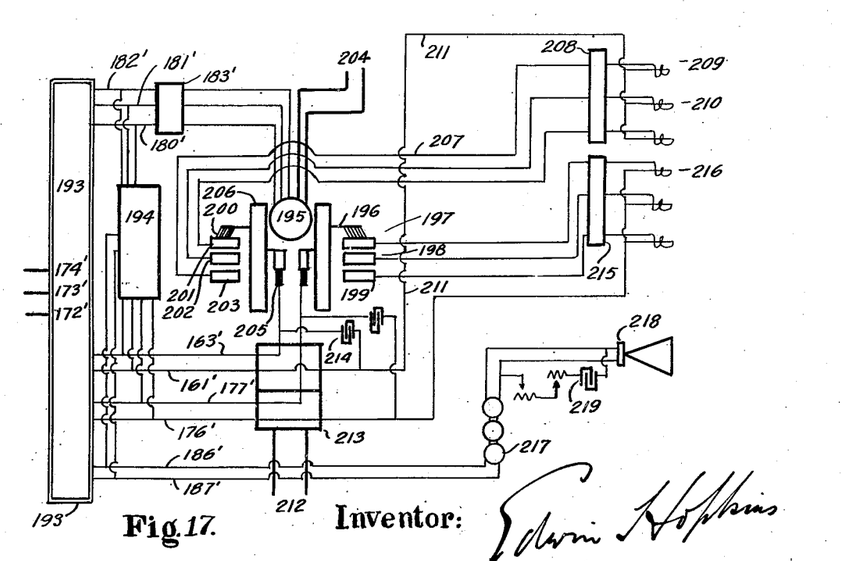

A form of electrical organization for the whole system of transmission and reproduction of talking motion pictures is shown in Figs. 16 and 17 (Sheet 4.)

Figs. 16 is a diagram of the connections of the initial or sending station and Fig. 17 of the terminal or reproducing end or station. The diagrams illustrate the conditions when two commutator rings are used in the sending and two in the reproducing station, from which the conditions for the use of one ring or a greater number than two may be readily seen.

Photo-electric cell bank 155 contains photo-electric cells 156 with cathode elements 157 and anodes 158, negative electrons carrying current from cathode to anode in the presence of light falling on the particular cell, as indicated by arrow heads enclosing dots. Should no light fall on a cell the current will not flow. The electron current passes through battery 159, through amplifier 160, which may be in the form of audion tubes or other convenient form of current amplification, and by lead 161 to band frequency filter system 162, from which it passes to the distant reproducing station or stations. Returning through the band filter it passes by lead 163 back through the amplifiers to brush 164, bowl 165, travelling brush 166, commutator segment 167 and lead 168 to cross-over 169 and thence to cathode 157 completing the circuit. The rotating brush 166 successively contacts with the segments 167, 170, 171 and completes a similar circuit for each cell, successively through leads 161, 163. At the same time rotary brush 175 effects similar connections for the photo-electric cell elements connected to its commutator segments through leads 176, 177 to the band filter 162.

Band filters are well known in the guided wave or wired wireless telephone transmission art, the band filter enabling a plurality of circuits to be sent over a single set of conductors. In this instance a three wire system is provided, but a pair of conductors may be used or a plurality of sets of conductors. Leads 172, 173 and 174 are shown leading from the band filter at the sending station and becoming 167', 173' and 174' at the reproducing station. Instead of a land wire transmission, wireless transmission may be employed.

Motor 178 operates the traveling brushes 166, 175, deriving its current from mains 179 or other convenient sources. In order to maintain the motor at the reproducing station in synchronism a three wire system with leads 180, 181 and 182 is provided, also passing though the band filter. At 183 is placed a transformer to render the current suitable for transmission.

Manometric flames 184 influence photo-electric cell 185, which transmits voice frequencies through leads 186, 187, to the band filter, where it is transmitted on one of the bands, the details of the battery of the circuit being omitted. Supplementary microphone 188 is in parallel for transmitting supplementary sounds, and both circuits are fitted with condensers 189 and inductance 190, 191 to filter out the natural harmonics of the diaphragms of the manometric flames and the microphone, though these filters are not essential.

Shunted across all the leads are connectors to a recording apparatus 192 with separate recording means for each of the circuits, as will be later described, but the preparation of such records is not essential, though if it be not desirable to have the scene transmitted at the time it is recorded, or in the case of a scene which will not later be re-enacted, the records may be made and later be utilized for transmitting either from the original initial sending station, or they may be shipped to the reproducing station and reproduced there. Any form of record may be employed by which electrical variations are utilized to make a permanent record, but the record of the consecutively delivered impulses taken from a group of cells in a cell bank receiving simultaneously portions of an image is new in the art in whatever form the record takes, as is also an acoustical record made by the amalgamation of a plurality of manometric flame effects.

Fig. 17 is a diagram of the terminal or reproducing station. Impulses from leads 161–163, 176–177, 186–187 and 180–181–182 pass through band filter 162 and are delivered to band filter for the incoming impulses 193, from which the respective currents pass to leads 161'–163', 176'–177', 186'–187', and 180'–181'–182' respectively. If it be desired to reproduce by means of records, the band filter may be cut out and the records put through the reproducer 194, and the impulses recorded by the recorder 192 will be reproduced on the several circuits. If records are not used 194 should be cut out.

Motor 195 rotates brush 200 bearing on segments 201, 202, 203. Motor 195 is operated by current from mains 204 but synchronizing current from lines 180'–181'–182' regulates its speed in any of the ways well known in the art of synchronizing motor speeds. 183' is a step-down transformer.

An impulse of current on 161'—163' reaches brush 205, passes to bowl 206, thence to traveling brush 200 and to segment 201, then by lead 207 to cross-over 208 and to incandescent filament 209 of lamp bank 210, the current passing back by common lead 211 to 161'. Since the current from 161'—163' would be too weak to cause filament 209 to illuminate, a source of electric current from the mains 212 is provided, with power modulator 213 of any convenient type. Thus the current which lights the lamp bank is locally derived but is modulated and controlled by the current from the sending station sent either by wireless or by guided wave means in the manner described. Across 163'—211 is condenser 214 to prevent sparking. Circuit 176'—177' similarly feeds lamps on the remaining portion of the lamp bank 215 through brush 196 and its commutator. These two lamp banks are, of course, fed simultaneously, lamps 209 and 216 burning simultaneously if cell 156 and cell 156' receive light simultaneously. Circuit 186'—187' carries acoustical effects. It passes through amplifier unit 217 and receiver 218 of any desired type, but especially of a loud speaking type. Filter 219 is provided to filter out the characteristic note of the receiver diaphragm, though this is not essential. Scenes transmitted by wireless or guided waves may be reproduced at a plurality of reproducing stations by parallel connections.

Figure 18:
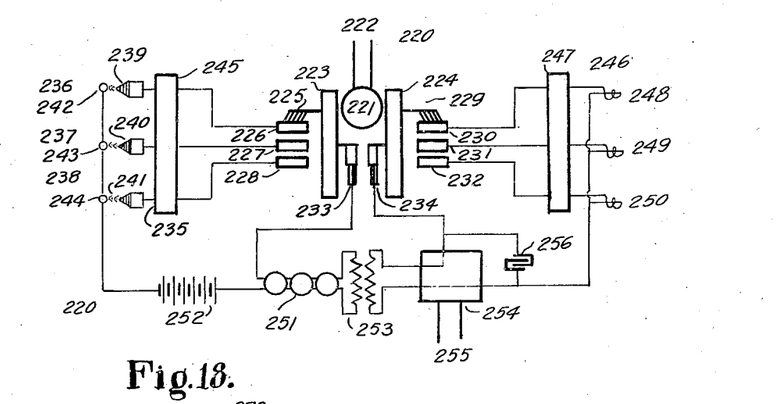
Fig. 18 is a diagram of the electrical connections of the invention as applied to the reproduction of a motion picture or actual scenes on an illuminated sky sign.

In utilizing the invention for purposes of outdoor display, such as sky signs; reproductions of actual scenes or of moving pictures or sign matter of any kind may be effected. The scene being enacted on the stage of a theatre may be shown on the theatre's sky sign, or a moving picture being shown in the theatre may be so reproduced on one or several sky signs. This may be accomplished by the use of the apparatus and connections shown, but a simpler method of operation may be used, as indicated by Fig. 18. (Sheet 5.)

The consecutive distributor 220 accomplishes the purpose of both receiving and transmitting impulses, and functions as a union of the two machines which when separated must be kept in synchronism. Motor 221 is fed by mains 222. There are two bowls, 223 and 224 with traveling brushes 225 and 229, brush 225 contacting with segments 226, 227 and 228 and brush 229 contacting with segments 230, 231 and 232, and stationary brushes 233 and 234 with corresponding collector rings. The cell bank 235 with cross-over 245 and cells 236, 237 and 238 having cathodes 239, 240 and 241 and anodes 242, 243 and 244 is connected to the stationary commutator segments 226, 227 and 228. Lamp bank 246 with cross-over 247 and lamps 248, 249 and 250 is connected to the stationary commutator segments 230, 231 and 232. Thus each cell in the cell bank is successively connected to its corresponding incandescent filament in the lamp bank on joining the terminals of stationary brushes 233, 234 and if the photo-electric current were strong enough the lamp bank would be illuminated whenever light shines on the cell bank. As the photo-electric current from battery 252 is weak, however, amplifiers 251 are inserted, with inductive coupling 253 to the incandescent circuit. As the current would still be insufficient a power modulator 254 of any desired type is inserted with inductive coupling to the incandescent circuit if desired, so that the current from mains 255, being modulated by the cell bank through coupling 253, the proper lamps burn at the proper moments. Condenser 256 is inserted to prevent sparking. It is impossible for this device to get out of synchronism since the traveling brushes which traverse the two stationary commutators are mounted on the same shaft. In such an arrangement, however, it is desirable for the consecutive distributor to be near enough to the lamp bank and cell bank to be reached by short lengths of cables from the commutator segments to the cross-overs, merely for reasons of economy. A good arrangement is to place the cell bank without camera attachment in a small projecting room behind or below the sky sign, and to project the moving picture directly on the cell bank. If the cell bank is of small units or small selenium cell units the moving picture may be made small and space be saved. With selenium units ¼" center to center a cell bank 6' 8" x 8' 0" would be equal to a cell bank 10' 0" x 12' 0" with ⅜" center to center lamps. If the lamp bank consists of individual incandescent bulbs 3 inches center to center it would be 80 x 96 feet in size and would be visible as a moving picture a mile or more away. No acoustical effects are indicated in the diagram Fig. 18 but such effects are, of course, within the invention and may be introduced in the manner indicated in Figs. 16 and 17.

In a theatre it is necessary for the lamp bank units to be small, the smaller the better. In case the lamp are too brilliant a ground glass or other cover may be placed over them and such cover may also tend to diffuse the light and produce a soft, lustrous picture, lacking the sharp outlines of the customary moving picture, being more of the nature of an impressionistic photograph.

If a group of theatres in New York be fitted with this invention connecting theatres in other cities could each reproduce any desired play from the New York group, a different one each night or repetitions of those most favored, without any expense whatever for making moving picture productions. The timeliness and addition of vocal effects should prove far superior to the customary silent picture which only reaches the audience months after the original production in New York is off and with a different cast of players.

Figure 20:
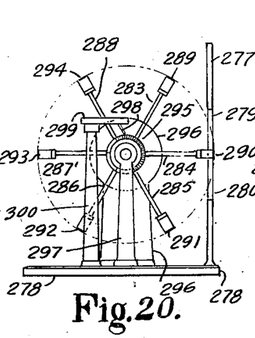
Fig. 20 is a side elevation and Fig. 21 a front elevation, with a portion in section, of the whirling bank for cells or lamps.
Figure 21:
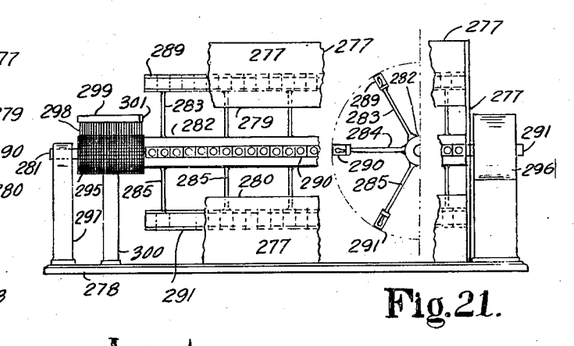

A variant form of the bank which I term a whirling bank is illustrated in Fig. 20 and Fig. 21, (Sheet 5.) Fig. 20 is an end elevation and Fig. 21 is a front elevation as seen by the audience in the case of a whirling lamp bank. The principle of this mechanism is that a lamp sweeping through an arc and varying its power of illumination will reproduce optical effects, provided the speed be suitable and the effect be repeated quickly enough to take advantage of persistence of vision.

A frame 277 is affixed to base 278 and has an aperture of the desired size of the moving picture. The top edge 279 and the bottom edge 280 of this aperture are in this instance far enough apart to enable the travelling lamps carried on an arm of a selected length to be seen during 60 degrees of their rotation. Mounted on a central shaft 281 is the hub 282, carrying six arms 283, 284, 285, 286, 287, 288 arranged in rows. Each row of arms carries a rank of lamps 289, 290, 291, 292, 293, 294 in a single line. As soon as one rank or paddle of lamps passes below the edge 280 of the exposure aperture, the next row appears at the top edge 279. If it takes $\frac{1}{16}$ of a second for a rank to pass through 60 degrees, a complete rotation will be made in $\frac{6}{16}$ of a second, a speed of 160 revolutions per minute of the central shaft. The persistence of vision is such that optical effects within $\frac{1}{16}$ of a second of each other seem continuous. When not in the visible sector the lamps are cut out. As the lamps pass through the visible sector of exposure aperture 279—280 their changes in illumination produce the optical effects desired, as one lamp may be out while the lamp in the adjoining file may be lit or partially lit, and vice versa. If the visible sector be divided into 320 imaginary parts, the work of one lamp is equivalent to the work of 320 lamps in a vertical row of the lamp bank, as it changes 320 times in that distance if 320 variations are transmitted to it from a stationary cell bank and consecutive distributor. To accomplish this, however, the lamp must be capable of changes at the rate of 5,120 per second, so that it is desirable to have the lamp bulbs filled with a gas which absorbs heat rapidly from the filament, such as hydrogen. It is also within the invention to place a ground glass or partially opaque screen before the visible sector so that while the lamp may not be extinguished, it will appear so when its brilliance falls below a certain point. The ground glass may be part of the lamp bulb itself rather than a separate screen, if desired.

While the usefulness of the whirling bank is limited by the speed of the bulb changes, it is much more available for sending purposes, as when fitted with ranks of photo-electric or other light sensitive cells it acts as a whirling cell bank. Since the electrons of the photo-electric cell are without appreciable inertia variations of 5,000 times a second are far within their limits, indeed they may vary millions of times per second.

When the whirling cell bank is fitted with commutators 295, one for each six cells on a file of cells on six paddles, there will be the same number of segments abreast a commutator as there are cells abreast on one rank or paddle of cells. These segments take the place of the sending consecutive distributor and may each be divided into 320 divisions, thus providing 320 impulses for each traversing of the visible sector by a cell, equivalent to a vertical row of chambers or cells on a 320 row cell bank, or 320 lamps on a lamp bank. It is not necessary, however, to make such division of segments since if current from the undivided segment of a cell of a whirling cell bank be transmitted to a stationary lamp bank, the consecutive distributor at the reproducing station will divide it properly among the successive lamps, provided the motor of the cell bank and the lamp bank are kept in synchronism, and provided, of course, that the ranks of the lamp bank are arranged vertically or the files of the cell bank horizontally, as the whirling bank in either form may be adapted to have its shaft rotate horizontally or vertically, and if the lamp banks are to be illuminated in turn horizontally by rows or ranks of cells, the whirling cell bank shaft must be placed vertically to swing the file horizontally.

The whirling cell bank may be subjected to optical effects directly or may be fitted with a camera lens attachment similar to the stationary cell bank. It is to be noticed, of course, that the cell bank image when received through a lens will be inverted on the cell bank. The cross-overs are utilized to correct this on the lamp bank or whirling bank.

When a whirling cell bank connects to a whirling lamp bank no consecutive distributors are necessary, unless the number of band frequencies is to be reduced below the number of ranks or files of circuits to be transmitted, as the case may be. The whirling lamp bank may have longer arms and a greater number of paddles, in which case the visible sector would be more nearly a plane, which is desirable.

A motor 296 rotates the whirling bank, shaft 281 being carried on the motor bearings and on bearing 297. Brushes 298 are carried on holder 299 carried by pillar 300. The entire apparatus may be enclosed in a room and if a screen of ground glass is not used one of plain glass is desirable in order to keep out dust, and if used out of doors, rain and snow. If a large number of files of lamps are used, intermediate bearings may be provided for the commutator shaft. When not used in circumstances requiring rapid changes of filament illumination, as in the reproduction of motion pictures, but where the rotation may be slower and the lamp changes slow, as in lettering effects changes in sky signs, a much better effect than is customary with such signs may be produced without any difficulty as to the rapidity of the changes of the illumination. In such cases a single paddle wheel may be sufficient, or two at most, which permits one set of paddles to be used in close proximity to another, so that a large screen may be fitted with several paddles without the expense of the very large paddle wheel that would be necessary were the visible sector less than 180 degrees.

At the inner end of the commutator at 301 is a separate brush and collector ring, a common terminal for all the cells of the whirling cell bank or all the lamps of the whirling lamp bank.

In the case of a sky sign whirling bank where it is desired to reproduce a motion picture, the paddle arms may be filled up so that no light shines between them and alongside of the lamp rank on each paddle may be placed a cell rank. The moving picture may then be case on the device from the rear and the cell currents amplified via the commutator and amplifiers and power modulator and illuminate simultaneously the rank of lamps in a visible sector. Or the cell paddles may be placed on one end of the main shaft and be of smaller dimensions.

Color effects may be obtained in the lamp bank by placing color screens before the cell elements. Adjoining cells may be screened in various colors such as red, green and blue and the corresponding lamps similarly screened, reproducing various natural colors. The screen may be placed before the bank or be part of the evacuated envelope.

For some uses both a photo-electric element and an incandescent filament element may be placed in the same lamp or chamber. By screening the photo-electric element from the rays of light of the incandescent lamp the bank may be used both for sending and reproducing when the circuits are distributors and commutators are properly arranged therefor.

In acoustical recording a plurality of microphones may be placed about the stage, and each circuit used to vary the light of an incandescent or other light, the rays of all the lamps being directed on a photo-electric cell which amalgamates them into a single circuit of electrical variations. To compensate for differences in tone strength due to varying distances of the microphone from the center of the stage, resistances may be introduced in each microphone-lamp circuit, or else the lamps may be placed at varying distances from the photo-electric cell. Or the cell may be omitted and the resistances inserted before amalgamating the microphone currents into a single current.

It is to be noted in the claims that in referring to lamps, lamp units and the lights or image of the lamp bank or whirling bank being in the same order or corresponding order as the cells or cell units of the sending bank, or sending bank of the whirling bank, such references include the reversed order necessary to prevent the image from being inverted on the lamp bank when a camera is used at the sending bank.

The expression stage includes any platform or place used for enacting scenes, and is not limited to the stage of a theatre.

What I claim is:

1. A television apparatus with a transmitter, adapted to select an optical field from nature, comprising in a bank a plurality of individual photoelectric cells arranged in a selected order adapted to be simultaneously and continuously exposed to varying light images from such field of nature, means adapted to derive varying electrical impulses from such photoelectric cells in rapidly repeated cycles, cell by cell, such electrical variations corresponding to the varying intensities of light received by such cells from moment to moment from nature; an optical reproducer comprising a bank of electrical lamps corresponding to such photoelectric cells of the transmitter and arranged in a similar selected order, adapted to be illuminated in rapidly repeated cycles, lamp by lamp and cycle by cycle by such electrical impulses from the cells of such transmitter, an electrical conducting line between such transmitter and reproducer, means comprising a rotary collector adapted to pick up from such cells, cell by cell, in successive cycles impulses of electric current supplied by such cells and to transmit such successive varying electric impulses to such reproducer, such reproducer fitted with a rotary distributor with means adapting it to be operated synchronously with such rotary collector, such rotary distributor adapted to deliver to such electric lamps of the reproducer in the same order within the cycles, and cycle by cycle such varying electrical impulses from the cells of the transmitter, such reproducer thereby adapted to display a light field varying in rapid sequential cycles, corresponding to such field of nature, such rotary collector and rotary distributor constituting a consecutive distributor of the class described comprising a motor for rotating brush bowls, a brush bowl on either side of such motor, adapted to carry two or more brushes, such bowls mounted on the motor shaft, collector rings for each bowl, one for each of the travelling brushes carried by the bowl; a stationary brush for each collector ring; electrical connections between each collector ring and its travelling brush, a stationary commutator for each travelling brush, concentric with and within the bowl carrying its brush, each commutator bearing individual segments adapted to be successively put into electrical contact with its stationary brush through the rotation of its travelling brush, whereby to establish simultaneously series of successive electrical pulsations, one series for each commutator, and electrical means adapted to maintain the motor in synchronism with a secondary motor operating a consecutive distributor reversely connected electrically, and such secondary motor adapted to operate such consecutive distributor reversely connected electrically, whereby to reproduce the varying optical effects of the field of nature selected by the transmitter.

2. In apparatus for the transmission and reproduction of optical effects, a whirling cell bank comprising a plurality of ranks of cells, the cells of any rank adjacent to each other, the cells of succeeding ranks in file, such ranks mounted on a rotating member at equal angular intervals, such cells adapted to produce electrical variations on being exposed to light variations; a frame or aperture through which the ranks of cells are visible, one at a time, during a portion of each rotation, a commutator with a segment for each cell, in files circumferentially for files of cells, each file of commutator segments having a stationary brush, such commutator adapted to rotate with such rotating member; a collector ring rotating with such member and having a stationary brush, such collector ring adapted to be a common terminal for all of the cells; a source of potential and circuit therefor so adapted as to provide a source of potential for each cell during its traversing of the aperture; an electrical motor adapted to rotate such rotating member, whereby to expose to light effects such ranks of cells during the passage of the aperture, said cells preferably photo-electric in nature, and in combination with the foregoing a similar organization but with electric lights in place of the cells, and communicating means whereby the light effects directed on the cell unit and transformed into electrical variations and re-translated from electrical variations to light illumination of the electric lights, whereby to reproduce the light effects received by the cell unit.

3. In an apparatus of the class described for the transmission and reproduction of optical effects a whirling cell bank as set forth in claim 2 adapted to rotate, and a motor for producing such rotation fitted with means for electrically maintaining synchronism in another motor adapted to operate means for reproducing optical effects from electrical variations originating in optical effects.

EDWIN HOPKINS.

REFERENCES CITED

The following references are of record in the file of this patent:

UNITED STATES PATENTS

| Number | Name | Date |
|---|---|---|
| 1,512,361 | Petersen | Oct. 21, 1924 |
| 1,595,735 | Schmierer | Aug. 10, 1926 |
| 1,612,359 | Chipman | Dec. 28, 1926 |
| 1,728,978 | Parker | Sept. 24, 1929 |
| Re. 17,712 | Schmierer | June 24, 1930 |
| 1,776,097 | Baird | Sept. 16, 1930 |
| 1,907,124 | Ruben | May 2, 1933 |

FOREIGN PATENTS

| Number | Country | Date |
|---|---|---|
| 191,405 | Great Britain | Oct. 4, 1917 |